United States Patent [19]

Wilcox

[11] Patent Number: 4,652,779

[45] Date of Patent: Mar. 24, 1987

[54] CENTER POLE FOR ROTARY ACTUATOR COIL WITH LOWERED INDUCTANCE

[75] Inventor: Lawrence A. Wilcox, Mustang, Okla.

[73] Assignee: Magnetic Peripherals Inc., Minneapolis, Minn.

[21] Appl. No.: 666,525

[22] Filed: Oct. 30, 1984

[51] Int. Cl.[4] .............................................. H02K 41/00
[52] U.S. Cl. ........................................ 310/13; 310/27
[58] Field of Search ..................................... 310/13, 27

[56] References Cited

U.S. PATENT DOCUMENTS

| | | | |
|---|---|---|---|
| 3,130,331 | 3/1964 | Jallen | 310/14 |
| 3,161,793 | 12/1964 | Laithwaite | 310/27 |
| 3,176,170 | 3/1965 | Fulton | 310/12 |
| 3,439,198 | 3/1969 | Lee | 310/13 |
| 3,470,399 | 9/1969 | Johnson | 310/13 |
| 3,495,147 | 2/1970 | Flora | 318/135 |
| 3,521,092 | 7/1970 | Kalthoff | 310/13 |
| 3,599,020 | 8/1971 | Harris | 310/13 |
| 3,619,673 | 10/1971 | Holms | 310/13 |
| 3,666,977 | 5/1972 | Holms | 310/13 |
| 3,783,311 | 1/1974 | Sato et al. | 310/27 |
| 3,816,777 | 6/1974 | Metzgar | 310/13 |
| 3,872,333 | 3/1975 | Imbert et al. | 310/27 |
| 3,889,139 | 6/1975 | Hughes | 310/27 X |
| 4,305,105 | 12/1981 | Ho | 360/106 |

*Primary Examiner*—Donovan F. Duggan
*Attorney, Agent, or Firm*—Joseph A. Genovese; Michael B. Atlass

[57] ABSTRACT

A construction for actuator assemblies is disclosed using a material of low permeance as a structural element, included normal to the axis of coil movement to lower coil inductance by reducing reactance flux in support structures and providing a channel for eddy currents set up in response to coil reactance. The net result is enhanced coil responsiveness to energization.

18 Claims, 5 Drawing Figures

CENTER POLE FOR ROTARY ACTUATOR COIL WITH LOWERED INDUCTANCE

This invention relates to improvements in the support structures for energized moving coils, and more particularly to such structures for use in rotary actuators. This invention has application to rotary actuators for use with computer disk drive storage devices.

BACKGROUND OF THE INVENTION

Actuators are used in disk-based information storage and retrieval to position the read/write elements over a radial location on a spinning disk-shaped storage element or elements. The actuator generally has a rotary actuator arm or parallel arms, solidly connected through a pivot point to a coil or a bobbin on the other side of said pivot point. The coil is positioned between or around permanent magnets. Energization of the coil causes it to move in a well known way between the magnets. This movement through said pivot point causes the read/write heads or elements to be moved in a direction opposite to said coil and bobbin, radially over the surface of the disk media.

Rotary actuator design is optimized in terms of mass and resistance when using a center pole which is inside the moveable coil and permanent magnets are outside the coil. The problem with this design is that a steel center pole increases the inductance of the coil slowing the coil's ability to energize and respond by accelerating or decelerating in its direction of movement. The prior art, in response to this problem, wrapped a shorted turn of copper around the center pole which would develop an induced current responsive to the reactance flux of the coil. Using a shorted copper turn however did not lower the inductance of the coil to the degree this invention does. Use of the shorted copper turn also requires an increase in the steel to magnet gap thereby lowering the torque available per amp of coil energization current.

Examples of solutions dissimilar to this invention for similar problems with inductance and reactive flux in voice coil or linear actuators include the shorted turn in U.S. Pat. No. 3,521,092; a conductive ring, coextensive with the winding in U.S. Pat. No. 3,176,170; use of a double set of permanent magnets to prevent reactance flux from extending through the entire coil path as in U.S Pat. No. 3,599,020; use of "sensing" coils responsive to drive coil energization in U.S. Pat. No. 3,470,399; and also the "bucking" coil of U.S. Pat. No. 3,619,673.

For various manufacturing reasons explained in more detail within, none of these solutions provide the same minimization of reactance flux in the center pole nor do they minimize the inductance of the coil as effectively as this invention.

SUMMARY OF THE INVENTION

Accordingly, this invention provides structure for enhancing the efficiency of coil energization. With reference to disk storage actuators which employ the inventive concepts herein, said increased coil energization efficiency may yield decreased extraneous vibration and increased accuracy and lowered time of placement of read/write heads or elements over radial locations on spinning storage disk media.

It is believed that this invention reduces coil reactance flux without affecting permanent magnet flux, and reduces coil inductance to accomplish this. This invention provides for the incorporation of a non-paramagnetic or diamagnetic material into the center of the longitudinal structure around or across which a coil moves in response to its energization.

The specific nature of the invention as well as other objects, advantages, features, and uses thereof will become evident from the following description of a preferred embodiment taken in conjunction with the accompanying drawings.

DETAIL DESCRIPTION OF PREFERRED EMBODIMENT

Figure 1:
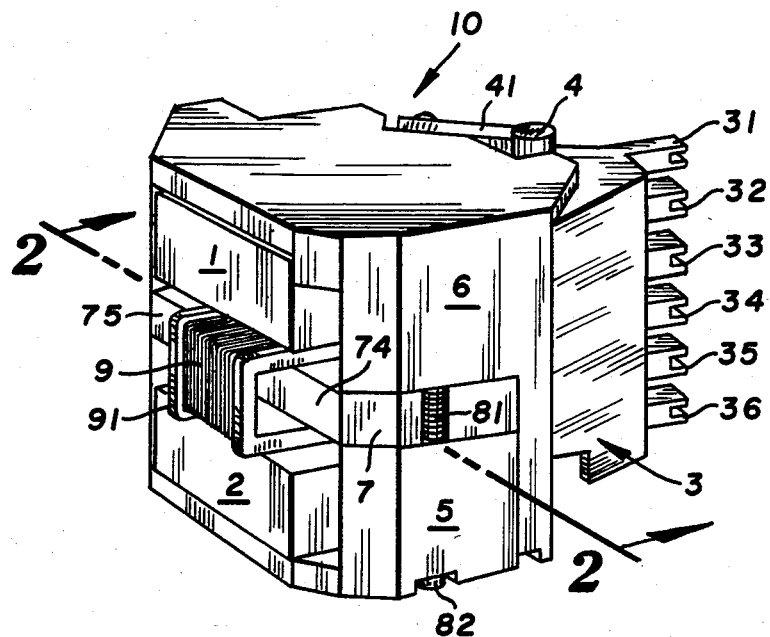
FIG. 1 is a perspective view of a preferred embodiment of the present invention as incorporated into a rotary actuator device.

Referring first to FIG. 1, a preferred embodiment actuator assembly 10 according to the present invention has a center pole 7. Center pole 7 is held in place between base support structure 5 and upper support structure 6 by fastening means 8 (here shown on one side as bolt 81 with head 82), and surrounded by coil 9, which is mounted on a lightweight support, bobbin 91. Bobbin 91 holds leads (not shown) for energization of coil 9 and is connected solidly across pivot member 4 to read/write head arm assembly 3 shown here with six parallel arm supports, 31 through 36. (The pivot member 4 is held in place at the "top" by retaining member 41.)

The actuator assembly housing comprises two main elements, a base support structure 5 and an upper support structure 6. Upper magnet 1 and lower magnet 2 are permanent magnets in the preferred embodiment, affixed to upper support structure 6 and base structure 5 respectively, and positioned with their like poles facing each other as shown. Energization of the coil 9, drives coil 9 and attached bobbin 91 from one side to the other of this center pole 7.

The center pole 7 is regarded as an important structural element in actuator assembly 10, without which proper alignment could be lost in assembly. It is a diamond shape in the preferred embodiment due to ease of manufacture.

The center pole 7 performs two other functions as well. It is believed to provide a pathway for eddy currents produced by reactance of the coil's magnetic field and more importantly it conducts the flux lines from the permanent magnets, allowing for a more concentrated field and thus more effective coil response to energization. The center pole must therefore be conductive and have permeance and the prior art has shown that a solid steel center pole provided the most useful substance for these and the structural properties just mentioned. Nevertheless the presence of a steel center pole allows the coil reaction flux which occurs upon energization of coil 9 to travel easily through the entire steel frame, comprising the center pole 7, upper support structure 6 and base support structure 5. The center pole and frame structure therefore, makes coil 9 a good inductor, reducing the efficiency with which it can respond to its own energization.

Figure 4:
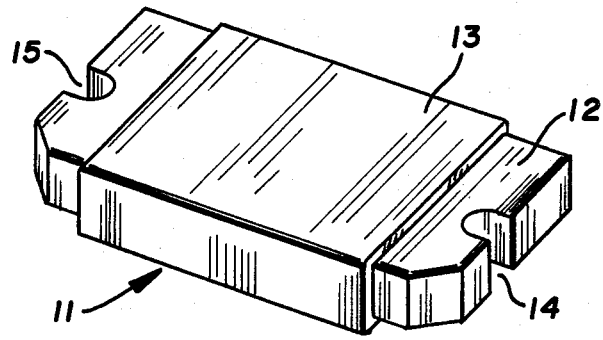
FIG. 4 is a perspective view of a prior art device.

The prior art common remedy to this problem was a center pole of the variety depicted in FIG. 4. It was simply wrapped with a shorted turn of a sheet of copper 13. The net effect of the shorted turn, was to lower the initial inductance of the coil 9. Other effects were to require the redesign of actuator assembly 10, by either expanding the entire frame size and the size of coil support bobbin 91, or by decreasing the size of magnets 1 and 2 and increasing frame size. Nevertheless the shorted turn does produce a shorter rise time in the current through the coil 9, and thus a more responsive coil, but still not to the extent of the present invention.

Figure 2:
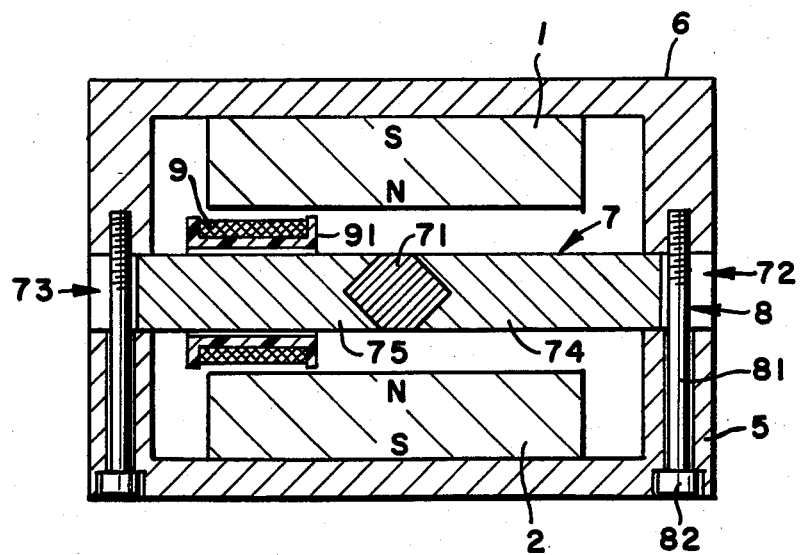
FIG. 2 is a cross section taken at line 2—2 of FIG. 1.
Figure 3:
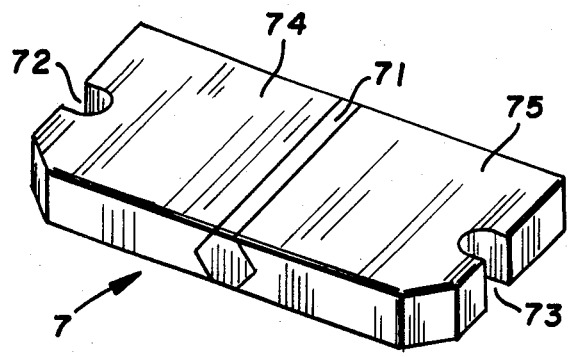
FIG. 3 is a perspective view of the preferred embodiment of the present invention shown in FIG. 1.

A center pole built in accord with this invention is illustrated in FIGS. 2 and 3. The invention provides for a copper bar 71 in the center of pole 7 between sides 74 and 75. The pole 7 is therefore completely divided by bar 71. The bar 71 should be regarded as a central piece whose form is primarily dependent on the manufacturing limitations imposed by the structure. It must extend completely (or nearly so) through the center pole or the center pole's equivalent in a differently built structure.

It is believed that the absence of the center pole or an air gap between a side 74 and a side 75 in a similar structure, would as well prevent reactance flux from traveling through the frame comprising base support structure 5 and upper support structure 6, but the alignment and frame strength referred to above would be reduced, and concentration of permanent magnet flux would be poor. Also, the copper bar 71 of center pole 7 may act as a conductor for the eddy currents set up by coil reactance. To support the structural element of center pole 7, any conductive non-paramagnetic material should do. Copper being diamagnetic is particularly well suited and it also provides a good conductive path for the coil reactance eddy currents. It is believed that any shape and size center piece which does not affect the flux lines of the permanent magnets but does adversely affect development of flux due to coil inductance would be in accord with the teaching herein.

Figure 5:
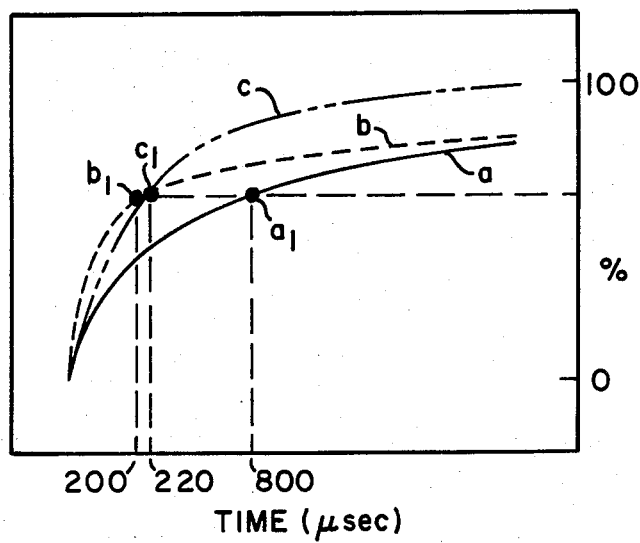
FIG. 5 graphs the comparative rise times for currents in coils of a plain steel center pole, a copper shorted turn center pole, and of the invention's center pole using copper.

It is found that an actuator employing the structure above described can decelerate up to 5 times faster than a solid steel center pole or 2 times faster than one using the prior art (copper shorted turn) center pole. FIG. 5 compares the current rise time characteristics in a proprietary rotary actuator device employing the invention and a plain steel pole (a), a copper shorted turn (b), the invention (c); time increases to the right, and current to the top, of FIG. 5.

Coil torque and thus actuator acceleration/deceleration are directly related to rise time, and points $a_1$, $b_1$, and $c_1$, depict the points at which coil response theoretically occurs (about 63 percent of current strength where inductance divided by resistance approximates unity). The curve produced by the preferred embodiment of this invention reaches the highest current level of the three.

What is claimed is:

1. A center pole means, for mounting along the longitudinal line of movement of a moveable coil within an actuator assembly, comprising two substantially half members mounted to a central piece mounted transversely to said line of coil movement, said central piece comprising material which is substantially less permeant to magnetic flux than said half portions, and wherein said central piece comprises copper.

2. A center pole means, for mounting along the longitudinal line of movement of a moveable coil within an actuator assembly, comprising two substantially half members mounted to a central piece mounted transversely to said line of coil movement, said central piece comprising material which is substantially less permeant to magnetic flux than said half portions, and wherein said central piece comprises material chosen from conductors of the group comprising non-paramagnetic and diamagnetic materials, and wherein said central piece comprises copper.

3. In an assembly housing having a body moveable in response to electrical energization and resultant movement of a coil attached firmly to said body, the improvement comprising a center pole means affixed to said housing and longitudinally disposed along the line of motion of said coil, said center pole means comprising two substantially half portions mounted to a transversely mounted central piece, said central piece comprising material which is substantially less permeant to magnetic flux than said half portions, and wherein said central piece comprises copper.

4. In an assembly housing having a body moveable in response to electrical energization and resultant movement of a coil attached firmly to said body, the improvement comprising a center pole means affixed to said housing and longitudinally disposed along the line of motion of said coil, said center pole means comprising two substantially half portions mounted to a transversely mounted central piece, said central piece comprising material which is substantially less permeant to magnetic flux than said half portions, wherein said central piece comprises material chosen from conductors of the group comprising non-paramagnetic and diamagnetic materials, and wherein said central piece is small enough not to interrupt permanent magnet flux lines, and wherein said central piece comprises copper.

5. An actuator for producing bidirectional, radial movement having an improved center pole member wherein said actuator comprises:
an output member for effecting said bidirectional, radial movement,
a frame means comprising at least three members; an upper structural member having top, right, and left side members; a lower structural member having base, right, and left side members, said lower member being of a substantially mirror image form to said upper member; a center pole member for fitting between said upper and lower members such that when said frame means is assembled said upper member and said lower member are joined left side to left side by one end of said center pole member and right side to right side by the other end of said center pole member,
upper and lower permanent magnets fixedly attached to said upper member and said lower member, respectively, so that like poles of each magnet extend toward said center pole member and wherein each of said magnets has a left end oriented toward the left sides of said upper and lower structural members, and each magnet has a right end oriented toward the right sides of said structural members, and said magnets are positioned closely enough to one another to allow permanent magnet flux paths from each of said permanent magnets to flow in a circuit through said center pole member; and through said upper member for said upper magnet;

and through said lower member for said lower magnet, and a coil and bobbin assembly comprising a coil of electrically conductive material on a bobbin for supporting said coil wherein said coil generates a magnetic field upon the application of current thereto and wherein said assembly is positioned over said center pole member in a concentric type arrangement and wherein said assembly is situated between said permanent magnets such that, said assembly moves right in response to current flowig through the coil in one direction and left where current flows in the other direction, and wherein said bobbin is linked to said output member which supports said bobbin and assembly in its above-described location between said magnets and around said center pole member and wherein said center pole member is comprised of at least three elements, a right half member, a left half member, both of materials with high permeance, and of a center piece, of low permeance material, thus allowing for easy passage of permanent magent flux but not coil reactance flux.

6. An actuator as set forth in claim 5 wherein said output member support said bobbin and coil assembly by means of its connection therewith through a pivot point supported by its output member's attachment to said frame means.

7. An actuator as set forth is claim 5 wherein said center piece is of sufficient size to substantially adversely affect the development of reactance flux due to coil energization but not of a sufficient size to substantially affect the permanent magnetic flux through said frame.

8. An actuator as set forth is claim 7 wherein said center piece is diamond-shaped and extends completely through said center pole member.

9. An actuator as set forth in claim 5 wherein said central piece is a material chosen from the group of materials which are electrically conductive diamagnetic and non-paramagnetic and which are of sufficient strength to not affect the structural integrity of said center pole in said frame.

10. An actuator as set forth in claim 5 wherein said central piece is copper.

11. In an assembly housing having a body movable in response to electrical energization and resultant movement of a coil attached firmly to said body, the improvement comprising a center pole means affixed to said housing and longitudinally disposed along the line of motion of said coil, said center pole means comprising two substantially half portions mounted to a transversely mounted central piece, said central piece comprising material which is substantially less permeant to magnetic flux than said half portions, wherein said central piece is small enough not to significantly affect permanent magnetic flux lines, but large enough to adversely affect development of flux due to coil inductance.

12. Apparatus as set forth in claim 11 wherein said central piece comprises material chosen from conductors of the group comprising non-paramagnetic and diamagnetic materials.

13. Apparatus as set forth in claim 11 wherein said central piece comprises copper.

14. Apparatus as set forth in claim 11 wherein said assembly housing is a data storage actuator assembly.

15. A center pole means, for mounting along the longitudinal line of movement of a movable coil within an actuator assembly, comprising two substantially half members mounted to a central piece mounted transversely to said line of coil movement, said central piece comprising material which is substantially less permeant to magnetic flux than said half portions, wherein said central piece is small enough not to significantly affect permanent magnet flux lines, but large enough to adversely affect development of flux due to coil inductance.

16. A center pole means as set forth in claim 15 wherein said central piece comprises material chosen from conductors of the group comprising non-paramagnetic and diamagnetic materials.

17. A center pole means as set forth in claim 16 wherein said central piece comprises copper.

18. A center pole means as set forth in claim 15 wherein said central piece comprises copper.

* * * * *